Nov. 3, 1931.  H. J. HORN  1,829,933
METHOD OF MAKING WELDING ELECTRODES
Filed July 10, 1928
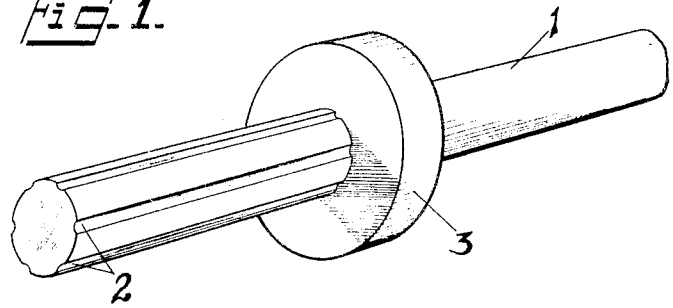
Fig. 1.
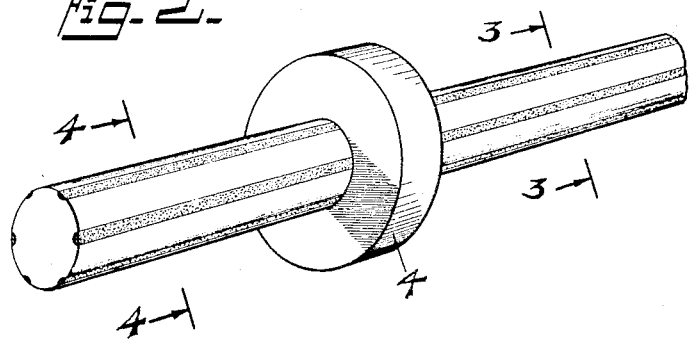
Fig. 2.
Fig. 3.
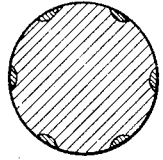
Fig. 4.
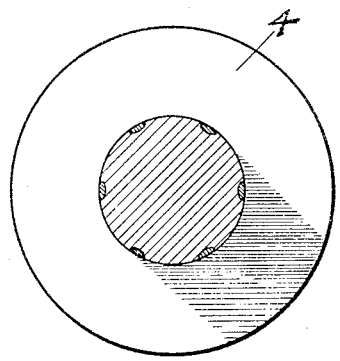
Inventor
Harold J. Horn
By his Attorneys
Philip Sawyer Rice Kennedy Patented Nov. 3, 1931

1,829,933

UNITED STATES PATENT OFFICE

HAROLD J. HORN, OF TRENTON, NEW JERSEY, ASSIGNOR TO JOHN A. ROEBLING'S SONS COMPANY, OF TRENTON, NEW JERSEY, A CORPORATION OF NEW JERSEY

METHOD OF MAKING WELDING ELECTRODES

Application filed July 10, 1928. Serial No. 291,514.

This invention relates to an improved method of making welding electrodes.

It is customary with an arc-welding electrode, such as an iron or steel wire, to incorporate therewith weld regulating substances. The weld regulating substances have been applied as a coating on the electrode, which has not proven durable under the bending, twisting and abrading treatment to which such wire is ordinarily subjected in transportation and use.

The present method provides a welding electrode which is readily and cheaply manufactured, may be subjected to the roughest handling without substantial loss of its weld regulating substance, and provides suitable metallic contact with the welding machine and for striking the arc.

For a full understanding of the invention, a detailed description of the invention in its preferred form will now be given in connection with the accompanying drawings forming a part of this specification and the features forming the invention then specifically pointed out in the claims.

In the drawings:

Figure 1 is a perspective view of the electrode in process of manufacture;

Figure 2 is a similar view of the electrode in its final manufacturing step;

Figure 3 is a section on line 3—3 of Figure 2; and

Figure 4 is an enlarged section on line 4—4 of Figure 2.

Referring to the drawings, the surface of the electrode wire stock 1 is suitably modified as by grooving or otherwise recessing to receive the weld regulating substance. Preferably one or more grooves 2 of sufficient size to hold the requisite amount of weld regulating substance are formed in the wire stock 1 by drawing, either by rolling or, as shown, by forcing through a suitable die 3. The grooved wire is then dipped into a weld regulating substance and the grooves filled, or the grooves are otherwise filled with the substance, which may advantageously be lime solution, either alone or with water glass, pyroxylin or other suitable binders, and the wire is then reduced to final size by further drawing, preferably through a reducing die 4 as shown.

The grooves or recesses are shallow and wide relatively to their depth, so that the further drawing does not result in the weld regulating substance being covered by the metal, but the grooves are open to the exterior of the wire to permit free flow of the weld regulating substance in the welding operation.

The drawing of the grooved wire stock to final size after dipping in the weld regulating substance is very important as this step not only tends to close the grooves slightly and bind the lime therein, but also the pressure produced by this step hardens the lime in the grooves so as to aid in preventing its coming out under rough treatment and usage.

What I claim is:

1. The process of making a welding electrode which consists in modifying the surface of the wire to provide recesses therein, filling the recesses with a weld regulating substance, and drawing the electrode to final size without closing the recesses on the exterior of the wire whereby the weld regulating substance is compacted by the drawing and the recesses are left open to the exterior of the wire to permit free flow of the weld regulating substance in welding.

2. The process of making a welding electrode which consists in forming one or more grooves therein, filling the grooves with a weld regulating substance, and drawing the electrode to final size without closing the grooves on the exterior of the wire whereby the weld regulating substance is compacted by the drawing and the grooves are left open to the exterior of the wire to permit free flow of the weld regulating substance in welding.

In testimony whereof, I have hereunto set my hand.

HAROLD J. HORN.